United States Patent [19]

Catlin et al.

[11] Patent Number: 4,677,433
[45] Date of Patent: Jun. 30, 1987

[54] TWO-SPEED CLOCK SCHEME FOR CO-PROCESSORS

[75] Inventors: Gary M. Catlin, Campbell; Jim Klovstad, Sunnyvale, both of Calif.

[73] Assignee: Daisy Systems Corporation, Mountain View, Calif.

[21] Appl. No.: 851,938

[22] Filed: Apr. 14, 1986

Related U.S. Application Data

[63] Continuation of Ser. No. 466,841, Feb. 16, 1983, abandoned.

[51] Int. Cl.[4] .............................................. H04Q 1/00
[52] U.S. Cl. .............................. 340/825.2; 340/825.22; 364/131
[58] Field of Search ................ 364/200, 900, 131–136; 307/269, 592; 377/52, 55; 368/184–189, 200–202; 340/825.2, 825.22, 825.71; 455/38

[56] References Cited

U.S. PATENT DOCUMENTS

| | | | |
|---|---|---|---|
| 4,130,866 | 12/1978 | Ono | 364/200 |
| 4,147,984 | 4/1979 | Caudel et al. | 455/38 |
| 4,254,475 | 3/1981 | Cooney et al. | 364/900 |
| 4,523,274 | 6/1985 | Fukunaga et al. | 364/200 |

*Primary Examiner*—Ulysses Weldon
*Attorney, Agent, or Firm*—Blakely, Sokoloff, Taylor & Zafman

[57] ABSTRACT

The present invention relates to a method and apparatus for a system utilizing a microprocessor having a faster maximum operating frequency and a numeric data processor having a slower maximum operating frequency which runs the system at the lower clocking frequency only during those times when both the microprocessor and the numeric data processor are required to perform processing functions and runs the system at the higher clocking frequency when only the microprocessor is required. Therefore the method and apparatus of the invention provides greater operating efficiency for the microprocessor, while not sacrificing the interface capabilities of the numeric data processor. In the apparatus of the present invention, the clocking frequencies are generated by a clocking generator which is coupled to both the microprocessor and the numeric data processor. The generator responds to signals from a control source to provide either the faster or the slower clocking frequency. The control source is responsive to program command such that it produces a first signal when the program does not require a numeric data processor to preform its processing functions and produces a second signal when the program requires te numeric data processor to perform its functions. In addition, a second signal from the source operates the reset of te numeric data processor.

8 Claims, 3 Drawing Figures

TWO-SPEED CLOCK SCHEME FOR CO-PROCESSORS

This is a continuation of application Ser. No. 466,841, filed Feb. 16, 1983 now abandoned.

BACKGROUND OF THE INVENTION

1. Field of the Invention

This invention relates to microprocessor systems, particularly those systems utilizing coprocessors at different clocking frequencies.

2. Prior Art

A fundamental problem exists when a microprocessor and a synchronous coprocessor, each having a different maximum allowable operating frequency, are utilized in the same system. Since the two processors must operate synchronously, they must be run at the same frequency. Thus, in the prior art, the maximum operating frequency of the system is limited to the maximum allowable frequency of the slower processor. The processor with the higher allowable operating frequency has to operate at only a percentage of its theoretical performance capability. For example, there are systems which utilize an 8087-3 numeric data processor and an 8086-1 microprocessor. The 8087-3 has a maximum allowable operating frequency 5 MHz, while the 8086-1 has a 10 MHz maximum frequency. Because the 8087-3 must operate synchronously with the 8087-1 by tracking its instruction flow, both processors must run at the coprocessor's maximum frequency of 5 MHz, which sacrifices much of the potential performance of the 8086-1. As a result, the efficiency of the system is greatly lowered since all functions will be performed at a slower rate.

As will be seen, the present invention relates to a method and apparatus for a system utilizing a microprocessor having a faster maximum operating frequency and a numeric data processor having a slower maximum operating frequency which runs the system at the lower clocking frequency only during those times when both the microprocessor and the numeric data processor are required to perform processing functions and runs the system at the higher clocking frequency when only the microprocessor is required. Therefore the method and apparatus of the invention provides greater operating efficiency for the microprocessor, while not sacrificing the interface capabilities of the numeric data processor.

SUMMARY OF THE INVENTION

A method and apparatus is described for interfacing a numeric data processor running at a slower maximum clocking frequency with a microprocessor which has a faster maximum clocking frequency which is a multiple of the slower frequency. In the apparatus of the present invention, the clocking frequencies are generated by a clocking generator which is coupled to both the microprocessor and the numeric data processor. The generator responds to signals from a control source to provide either the faster or the slower clocking frequency. The control source is responsive to program commands such that it produces a first signal when the program does not require a numeric data processor to perform its processing functions and produces a second signal when the program requires the numeric data processor to perform its functions. In addition, a second signal from the source operates the reset of the numeric data processor.

Whenever a program is run requiring the faster clocking frequency, the first state of a second signal, provided by the control source, resets the numeric data processor which causes the output lines of the numeric data processor to be tristated, such that the numeric data processor will not interfere with the microprocessor's operation and the numeric data processor will not be adversely affected by the faster frequency. Once the numeric data processor is reset, the first state of the first signal, provided by the control source, is applied to the input of the clocking generator to select an internal clocking frequency source. The output of the internal clocking frequency source is divided by the generator's internal divide-by-three circuit to produce the faster clocking frequency which is then applied to the microprocessor and the numeric data processor.

When a program is run that requires both the microprocessor and the numeric data processor to carry out its functional requirements, the higher clocking frequency must be slowed down to the slower clocking frequency. Therefore, the program causes the control source to provide the second state of the first signal to the input of the clocking generator. The second state of the first signal causes the control generator to select an external frequency as the clocking frequency source. The external frequency is the output frequency of the internal clocking frequency source divided by a division circuit which divides the internal clocking frequency by the multiple of the faster frequency to the slower frequency. The output of the division circuit is then applied to a second input of the clocking generator. The external frequency is then divided by the generator's internal divide-by-three circuit to provide the slower clocking frequency at its output which is then applied to the microprocessor and the numeric data processor.

Once the clocking frequency is at the slower frequency, the second state of the second signal from the control source releases the numeric data processor from reset. Then, a special sequence of instructions are applied to the microprocessor and numeric data processor to synchronize each of their instruction queues to each other. As a result, the floating point operation using the numeric data processor can proceed.

When the numeric data processor is no longer required, the second signal generated by the control source resets the numeric data processor to tristate its output lines. Then, the control source is cleared to notify the clocking generator to resume generating the faster clocking frequency so that the microprocessor can execute its functions at full operating performance.

These and other objects and features of the present invention will become apparent to one skilled in the art in view of the following specification and its accompanying drawings, in which like reference numerals refer to like parts, and in which:

A two-speed clocking scheme is described which is particularly useful for using a slower frequency processor and a processor having a faster frequency which is a multiple of the slower frequency in the same system. In the following description, numerous specific details are set forth such as specific microprocessor and data processor and clocking frequencies in order to provide a thorough understanding of the present invention. However, it will be obvious to one skilled in the art that the present invention may be practiced without these specific details and parts. In other instances, well known circuits, program controllers, oscillators, etc. are not set forth in detail in order not to obscure the present invention in unnecessary detail.

The invention in its preferred embodiment is used in a computer system which employs an 8086-1 as the microprocessor (i.e. central processing unit, hereinafter referred to as the "CPU") which has a maximum clocking frequency of 10 MHz for optimal efficient operation. The invention also employs an 80873-3 as the numeric data processing unit (hereinafter referred to as "NDPU") which has a maximum clocking frequency of 5 MHz for optimal efficient operation. An ordinary clocking generator such as an 8284 is also used in the invention for generating the clocking pulses for the CPU and NDPU.

The 8086 hardware and software characteristics are aimed at enabling coprocessing. The coprocessor interfaces directly to the CPU's local bus. The CPU's local bus includes the multiplexed address/status and address/data lines, the status lines, the queue status lines, and function lines.

Figure 1:
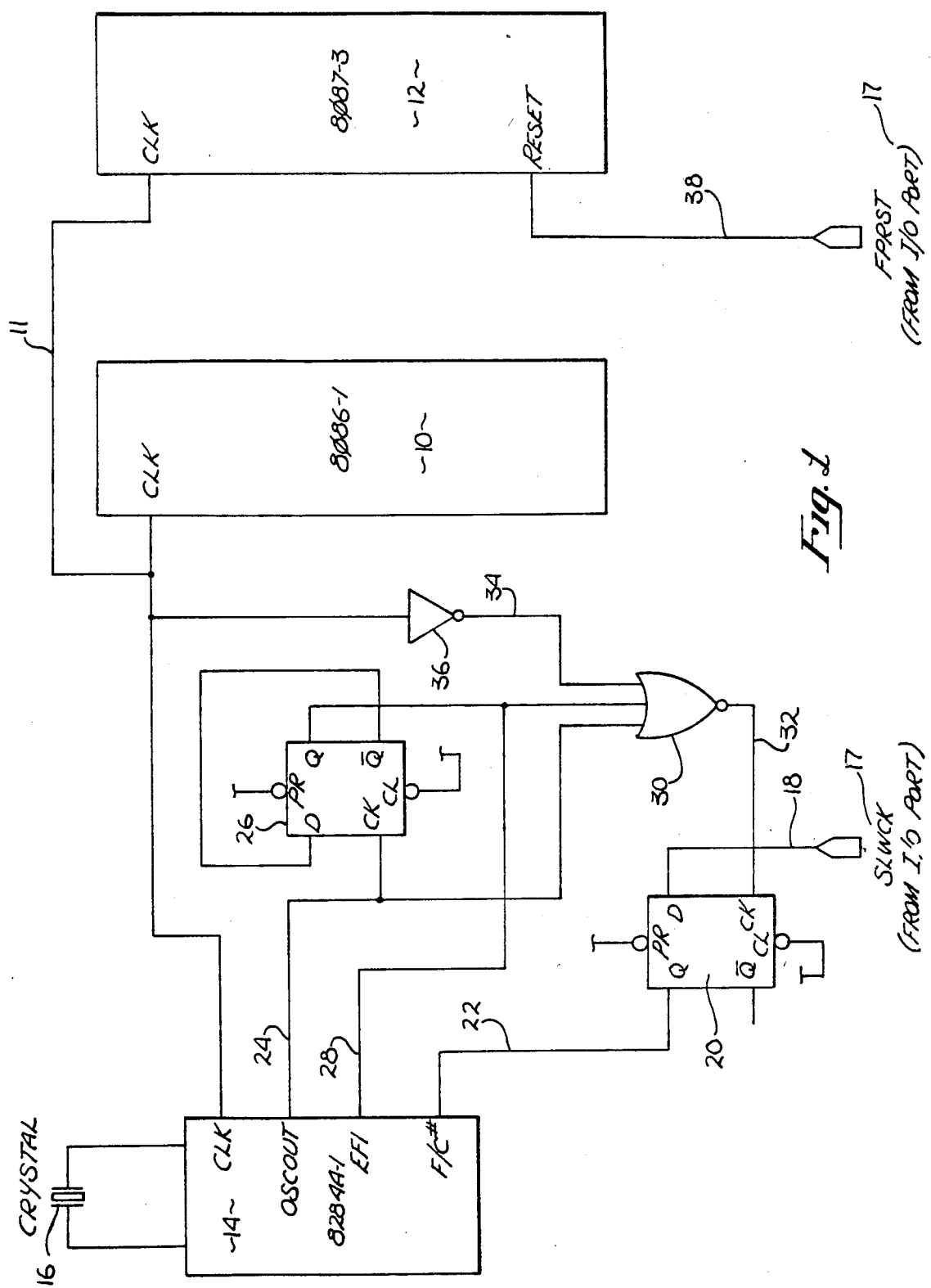
FIG. 1 is a general block diagram illustrating the two speed clocking scheme of the present invention.

Referring first to FIG. 1, the CPU 10 is coupled to the NDPU 12 via a bus (not shown). A standard clocking generator 14 provides clocking pulses which are applied via line 11 to the CPU 10 and the NDPU 12. The CPU and the NDPU receive the clocking pulses on line 11 from the clock (CLK) output of the standard clocking generator 14. For purposes of this application, only the clocking pulses on line 11 are shown. However other inputs are necessary to be applied to the CPU and NDPU for their operation.

The synchronizing flip-flop 20 receives a control signal (SLWCK) on line 18 from a control source 17 which is an input/output (I/O) port. The SLWCK signal is generated by the I/O port control register in response to control signals generated by the software or any other suitable means to notify the I/O port whether to generate a digital "1" which indicates that both the CPU 10 and NDPU 12 will be used or whether to generate a digital "0" which indicates that only the CPU 10 will be necessary to perform functions. The synchronized SLWCK signal is applied to the F/C#input of the generator 14 to select either an internal clocking frequency source or an external frequency source as the control frequency source. The slower clocking pulse of 5 MHz will be generated in generator 14 when the external frequency source is selected and the faster pulse of 10 MHz will be generated when the internal clocking source is selected.

In the prior art, the F/C#input of the generator was intended as a hard-wired strapping option. However, in the present invention it allows programmable selection of the frequency generation such that the crystal oscillator 16 or the EFI signal will generate the clocking frequency within the generator 14.

The internal clocking frequency of generator 14 is generated by means of a crystal oscillator. The oscillator selected must oscillate at three times the maximum desired CPU frequency, so that in the preferred embodiment the crystal oscillator has a frequency of 30 MHz.

When only the CPU 10 is to be used to perform program functions such that the 10 MHz output is required, the SLWCK pulse sets the F/C#input of generator 14 to select the oscillator's output as the frequency source. The oscillator's output ("OSCOUT") is then divided by the generator's internal divide by-three circuit (not shown) to produce a 10 Mhz clocking pulse at the CLK output.

When both the CPU and the NDPU are to be used to perform program functions, the 5 MHz output is required. The SLWCK pulse sets the F/C#input to select the external frequency as the frequency source which is applied to the external frequency input (EFI) of the generator 14. The external frequency is generated by applying the 30 MHz oscillator output ("OSCOUT") to a divide-by-two circuit 26 which is then applied to the EFI to create a 15 MHz signal. The 15 MHz signal is then divided by the generator's internal divide-by-three circuit to produce the 5 MHz clocking pulse which appears at the clock output. Hence, the SLWCK bit synchronously switches the clocking generator's input between 15 MHz and 30 MHz.

The OSCOUT and the 15 MHz output of the divide-by-two circuit 26 are also applied to a NOR gate 30. The CLK output of generator 14 is also applied to the NOR gate 30 through an invertor 31. The output of NOR gate 30 insures the synchronization of the F/C#signal to the CPU CLK so that the transition between the fast clocking signal and the slow clocking signal does not interrupt the CPU's operation.

Another pulse, FPRST, is generated by the I/O port and applied to the reset input of the NDPU 12. Whenever the clocking frequency is to be set at the maximum frequency of 10 MHz, the FPRST signal is held high which then causes the processor 12 to tristate its output lines so that it will not interfere with the CPU 10's operation and also not be adversely affected by the high frequency clocking signal. However, whenever the NDPU is to be utilized, after the clocking pulse has reached the slower 5 MHz frequency, the FPRST bit will release the reset of the NDPU 12 so that it may resume operation.

Figure 2:
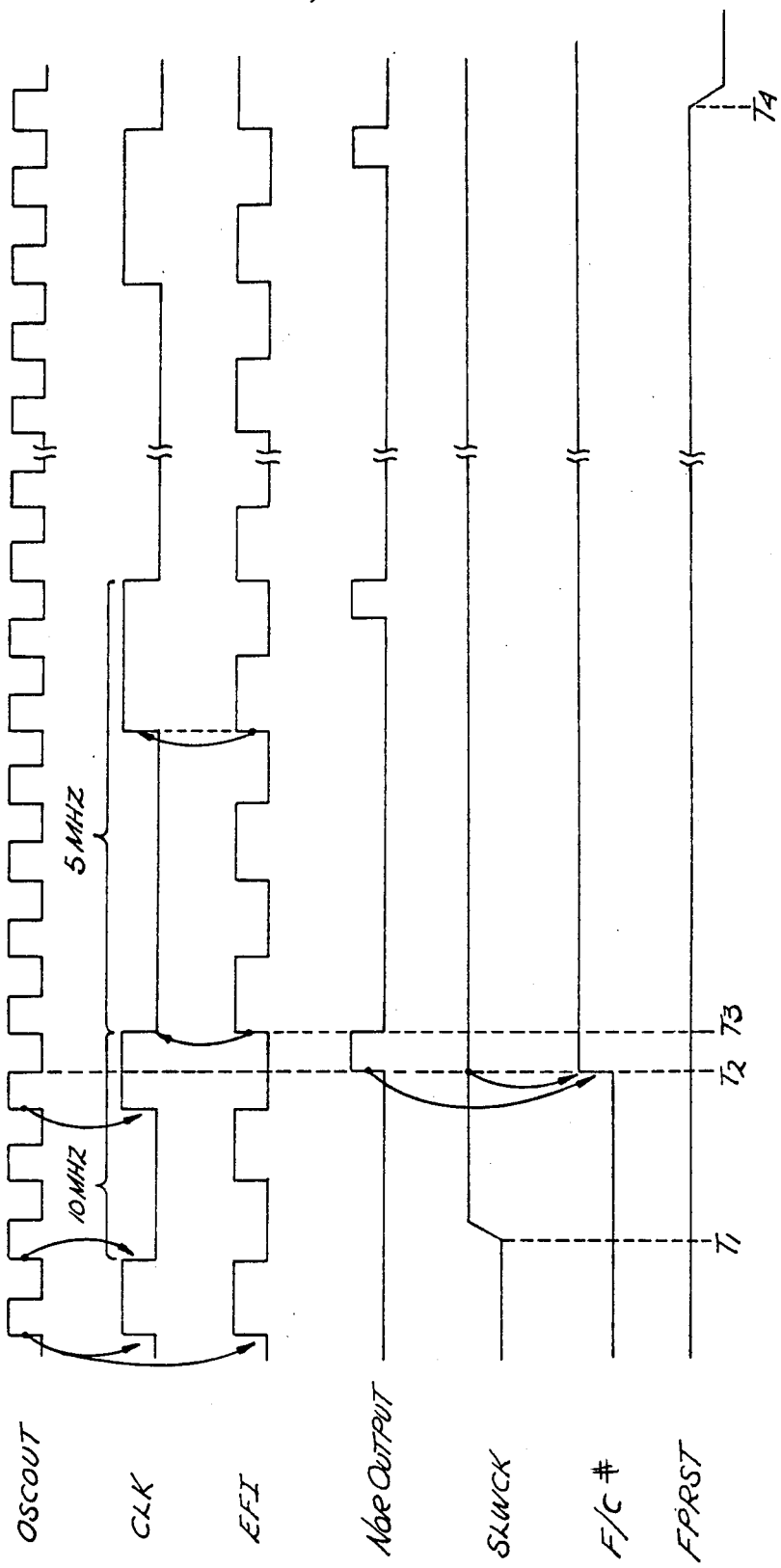
FIG. 2 is an illustration of the waveforms of various components of FIG. 1 illustrating what occurs when the faster clocking frequency is switched to the slower clocking frequency.
Figure 3:
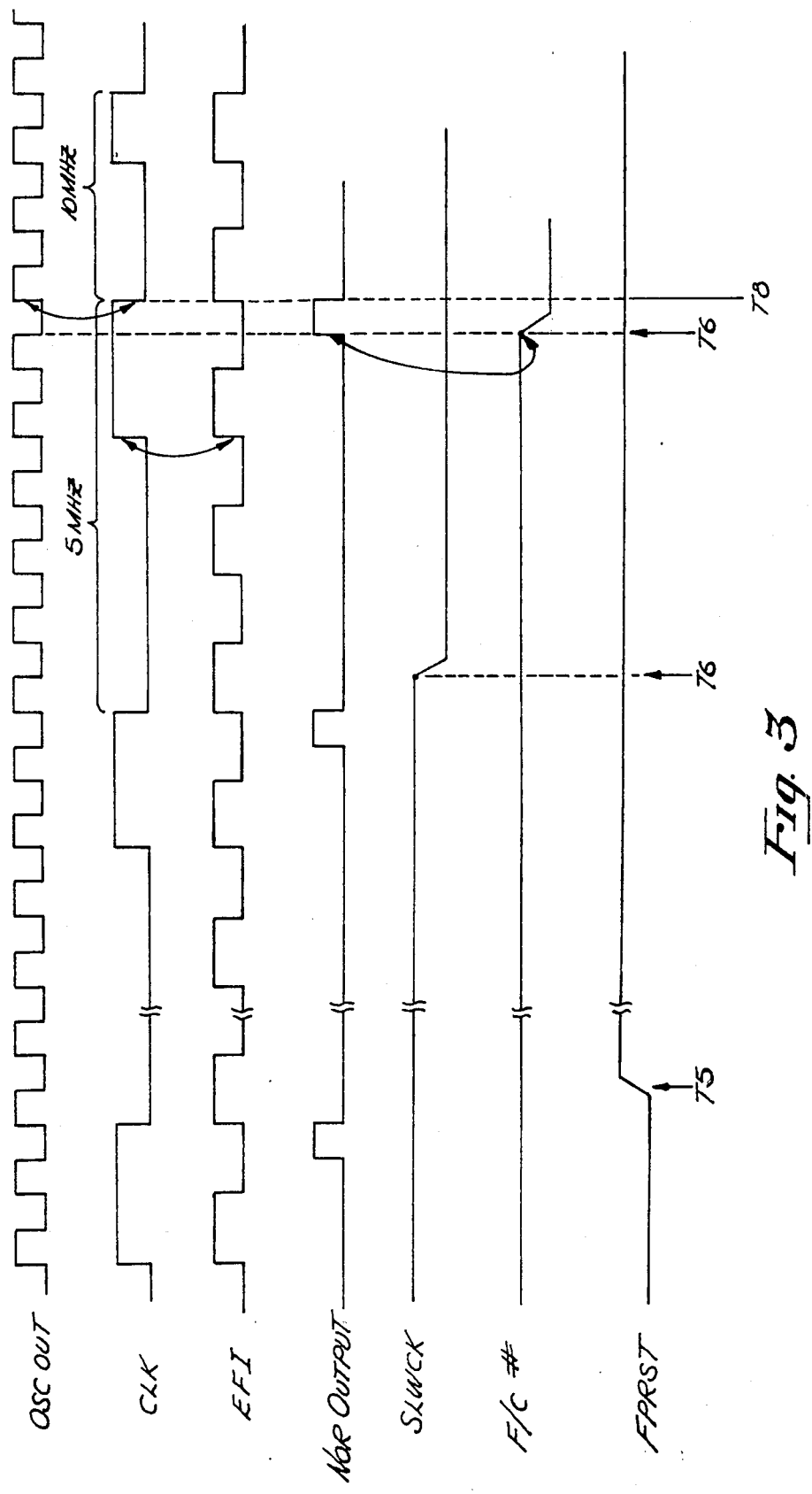
FIG. 3 an illustration of the waveforms of various components of FIG. 1 illustrating what occurs when the slower clocking frequency is switched to the faster clocking frequency.

The operation of the system of FIG. 1 of the present invention will now be described in conjunction with FIG. 2 to show the waveforms of the inputs and outputs of the various components when both the NDPU 12 and the CPU 10 are operating and also in conjunction with FIG. 3 to show the waveforms when the NDPU is not required such that the CPU 10 is operating alone.

Operation of the coprocessor system is controlled via the software which writes to the I/O port mapped control register 17. Two signals are then generated by I/O port 17. One signal is the dual state SLWCK signal which controls the clocking frequency of generator 14 and the other signal is the dual state FPRST signal which controls the reset operation of the NDPU 12.

When the program requires the NDPU 12 (such as to perform floating point operations), the software writes to the I/O port 17 so that the SLWCK bit will be generated, as shown by the "high" (i.e. a digital one) pulse at time $T_1$ in the SLWCK waveform. The SLWCK bit is synchronously applied through flip flop 20 to the F/C#input in clocking generator 14 which is shown in FIG. 2 by the high pulse at time $T_2$ in the NOR output and the F/C#waveform. The NOR output insures the synchronization of the slower frequency signal to the CPU CLK so that the transition does not interrupt the CPU's operation. The high pulse in the F/C#waveform selects the external frequency input (EFI) as the control frequency source which is applied through the generator's internal divide-by-three circuit to the CLK output at time $T_3$.

After the clocking frequency reaches 5 MHz, the software writes to the I/O port 17, such that the FPRST bit will be set low (i.e. a digital zero) to release the NDPU 12 from reset to allow the NDPU to become active.

A special sequence of instructions will then synchronize the CPU and NDPU 12 instruction queues to each other. Thus, the floating point operations using the NDPU 12 can proceed.

When the NDPU 12 is no longer necessary for program functions, the I/O port 17 generates the FPRST signal as a digital "1" to reset the NDPU 12. After the NDPU 12 is reset, the software writes to the I/O port 17 at time $T_6$ to set the SLWCK bit low. At time $T_7$ when the next NOR pulse occurs, the low SLWCK bit is applied to the F/C#input through flip flop 20 to select the oscillator as the control frequency source. The oscillator output is divided by three and applied to the CLK output of generator 14. As a result, the next CLK pulse at time $T_8$ will be at 10 MHz. Thus, the CPU can operate at maximum efficiency.

An example of the software procedures used to slow the clock and enable the NDPU or restore the clock to 10 MHz is illustrated below This procedure is used to slow the clock and enable the 8087:

| Procedure 87on: | |
| --- | --- |
| MOV DX, 00D9H | |
| MOV AL, 61H | |
| OUT DX, AL | ;slow clock to 5 MHZ |
| MOV AL, 41H | |
| OUT DX, AL | ;remove reset from 8087 |
| JUMP NEXT | ;synchronize queue logic |
| NEXT:FINIT | ;8087 initialization |
| RET | |

This procedure is used to restore the clock to 10 MHZ:

| Procedure 87off: | |
| --- | --- |
| WAIT | ;Allow 8087 to finish |
| MOV DX, 00D9H | |
| MOV AL 40H | |
| OUT DX, AL | ;Reset 8087 |
| MOV AL 60H | |
| OUT DX AL | ;Sets clock to 10 MHZ |
| RET | |

Thus, has been described a new clocking scheme for a system in which two coprocessors with different maximum operating frequencies can each operate at maximum efficiency.

Obviously, while the invention has been disclosed and described with respect to a specific preferred embodiment thereof, it will be understood by those skilled in the art that various changes in form and detail may be made therein without departing from the spirit and scope of the invention.

What is claimed is:

1. A clocking scheme for a computer system, comprising:
    a first processor operating at a first frequency,
    a second processor operating at either said first frequency or a second frequency which is a multiple of said first frequency;
    input means for receiving a first and second signals, each of said signals having a first and second states, said first state of said second signal deactivating said first processor and said second state of said second signal activating said first processor, said second signal being coupled to said first processor;
    clocking means coupled to said first and second processors and to said first signal for generating a clocking signal, said clocking means responsive to said first state of said first signal for generating said clocking signal having said second frequency to clock said saecond processor after said second signal deactivates said first processor, and responsive to said second state of said first signal for providing said clocking signal having said first frequency to said first and second processors after said second state of said signal activates said first processor;
    said second processor operating at said second frequency when operating alone, but is synchronized to operate with said first processor at said first frequency when said first processor is activated;
    whereby processing speed of said second processor is changed.

2. The clocking scheme of claim 1, wherein said clocking means further comprises:
    oscillation means having a control frequency source, wherein when said first state of said first signal is applied to said clocking means, said oscillation means for generating an oscillation frequency which is used to provide said first and second frequencies.

3. The clocking scheme of claim 2, wherein said clocking means further comprises:
    a divider circuit coupled to said oscillation means for dividing said oscillation frequency when said second state of said first signal is applied to said clocking means, said divider circuit used to provide said first frequency.

4. The clocking scheme of claim 1, wherein said clocking means further comprises:
    oscillation means having a control frequency source for providing a base frequency;
    a frequency generating circuit coupled to said oscillation means for converting said base frequency to provide said first and second frequencies;
    selection means for selecting between said first and second frequencies, wherein when said first state of said first signal is applied to said clocking means, said clocking means provides said second frequency, and wherein when said second state of said first signal is applied to said clocking means, said clocking means provides said first frequency.

5. A clocking scheme for a computer system utilizing a first processor and a second processor, said first processor operating at a first frequency and said second processor operating at either said first frequency or a second frequency which is a multiple of said first frequency, comprising:

input means for receiving a first and second control signals, each having a first and second state, said first state of said second signal deactivating said first processor, said second state of said second signal activating said first processor;

clocking means coupled to said first and second processors and to said first signal for generating a clocking signal, said clocking means responsive to said first state of said first signal to provide said clocking signal having said second frequency to clock said second processor after said second signal deactivates said first processor, and responsive to said second state of said first signal to provide said clocking signal having said first frequency to said first and second processors after said second state of said signal activates said first processor;

said second processor operating at said second frequency when operating alone, but is synchronized to operate with said first processor at said first frequency when said first processor is activated;

a base frequency source coupled to said clocking means for providing a base frequency signal having a third frequency which is a multiple of said first and second frequencies;

whereby dual speed clocking is achieved.

6. The clocking scheme of claim 5, wherein said clocking means further comprises:

oscillation means coupled to said base frequency source for converting said third frequency to said second frequency wherein when said first state of said first signal is applied to said clocking means, said oscillation means provides said second frequency, a frequency divider circuit coupled to said oscillation means for providing a dividing function by dividing said third frequency to provide said first frequency, wherein when said second state of said first signal is applied to said clocking means, said frequency divider circuit provides said first frequency selecting means coupled to said input means, oscillation means and said frequency divider circuit to select between said first and second frequencies, said first signal controlling said selection.

7. A method for generating clocking signals for a system utilizing an operating program, a first processor operating at a first frequency, and a second processor operating at either said first frequency or a second frequency, wherein said second frequency is a multiple of said first frequency and wherein said first processor is acitve only when required to perform certain processing functions, said second processor being active at all times, comprising the steps of:

generating a first and second signals in response to a command from the operating program, each signal having a first and second states, wherein said first state of said first signals is generated only when said second processor is to be utilized in performing processing functions, and said second state of said first signal is generated only when both said first processor and said second processor are used to perform processing functions;

whereby said second processor operates at one of two clocking speeds dependent on activation of said first processor.

8. The method of claim 7, wherein when said first processor is no longer required to perform program functions, generating said second frequency which is higher than said first frequency in response to said first state of said first signal;

generating said second state of said second signal to reset said first processor, wherein said second processor will not interfere with the operation of said first processor, and applying said higher frequency to said first and second processors.

* * * * *